US009477240B2

(12) United States Patent
Musunuri et al.

(10) Patent No.: US 9,477,240 B2
(45) Date of Patent: Oct. 25, 2016

(54) CENTRALIZED CONTROLLER FOR INTELLIGENT CONTROL OF THERMOSTATICALLY CONTROLLED DEVICES

(71) Applicant: EATON CORPORATION, Cleveland, OH (US)

(72) Inventors: Shravana Kumar Musunuri, Pune (IN); Naveen Kumar Thokala, Pune (IN); Charles J. Luebke, Hartland, WI (US); Abhay Shinde, Pune (IN)

(73) Assignee: EATON CORPORATION, Cleveland ( * ) Notice: Subject to any disclaimer, the term of this patent is extended or adjusted under 35 U.S.C. 154(b) by 643 days.

(21) Appl. No.: 13/872,541

(22) Filed: Apr. 29, 2013

(65) Prior Publication Data

US 2014/0324244 A1   Oct. 30, 2014

(51) Int. Cl.
*G05B 15/02*   (2006.01)
*G06N 99/00*   (2010.01)
*G05D 23/19*   (2006.01)

(52) U.S. Cl.
CPC .............. *G05D 23/19* (2013.01); *G05B 15/02* (2013.01); *G06N 99/005* (2013.01); *G05D 23/1934* (2013.01)

(58) Field of Classification Search
CPC .... G05B 15/02; G06N 99/005; G05D 23/19; G05D 23/1934
USPC ......... 700/276, 278, 291, 299, 300; 236/1 C, 236/46 A, 91 C, 91 D, 91 F
See application file for complete search history.

(56) References Cited

U.S. PATENT DOCUMENTS

| | | | |
|---|---|---|---|
| 8,091,794 B2* | 1/2012 | Siddaramanna | F23N 5/203 236/1 C |
| 8,108,076 B2* | 1/2012 | Imes | F24F 11/0086 340/686.6 |
| 8,174,381 B2* | 5/2012 | Imes | F24F 11/0086 340/539.11 |
| 8,352,082 B2* | 1/2013 | Parker | F24D 19/1048 700/276 |
| 8,571,518 B2* | 10/2013 | Imes | F24F 11/0086 236/91 E |
| 9,016,593 B2* | 4/2015 | Metselaar | F24F 11/0012 236/1 C |
| 2011/0015802 A1* | 1/2011 | Imes | G05D 23/1923 700/300 |
| 2011/0046792 A1* | 2/2011 | Imes | F24F 11/0086 700/278 |
| 2011/0054699 A1* | 3/2011 | Imes | F24F 11/0086 700/276 |
| 2011/0160913 A1* | 6/2011 | Parker | F24D 19/1048 700/276 |
| 2012/0131324 A1* | 5/2012 | Ansari | H04Q 9/00 713/100 |
| 2012/0165993 A1* | 6/2012 | Whitehouse | G05D 23/1904 700/278 |
| 2012/0259469 A1* | 10/2012 | Ward | G05D 23/1917 700/276 |
| 2013/0060387 A1* | 3/2013 | Imes | F24F 11/0086 700/278 |

(Continued)

*Primary Examiner* — Charles Kasenge
(74) *Attorney, Agent, or Firm* — Eckert Seamans; Philip Levy; Grant Coffield

(57) ABSTRACT

A control module for controlling a thermostatically controlled device includes a processor apparatus adapted to obtain first values for a plurality of parameters for the thermostatically controlled device, the parameters including actual power consumed by the thermostatically controlled device and a number of input parameters, determine a learned correlation function for the thermostatically controlled device based on the obtained values, wherein the learned correlation function relates power consumption of the thermostatically controlled device to at least the number of input parameters, obtain second values for each of the number of input parameters for a future usage period, and determine at least one recommended set point for the thermostatically controlled device using the learned correlation function and at least the second values for each of the number of input parameters.

23 Claims, 4 Drawing Sheets

(56) References Cited

U.S. PATENT DOCUMENTS

| | | | |
|---|---|---|---|
| 2013/0099011 A1* | 4/2013 | Matsuoka | G05D 23/1904 236/1 C |
| 2013/0173064 A1* | 7/2013 | Fadell | G05D 23/1902 700/276 |
| 2014/0058567 A1* | 2/2014 | Matsuoka | G05D 23/1917 700/276 |
| 2014/0316581 A1* | 10/2014 | Fadell | F24F 11/0009 700/276 |
| 2014/0324240 A1* | 10/2014 | Thottan | G01D 4/00 700/291 |

* cited by examiner

CENTRALIZED CONTROLLER FOR INTELLIGENT CONTROL OF THERMOSTATICALLY CONTROLLED DEVICES

BACKGROUND

1. Field

The disclosed concept relates generally to the control of thermostatically controlled devices, and, in particular, to a system employing a centralized control module for intelligently controlling a number of thermostatically controlled devices.

2. Background Information

A typical U.S. residential home has multiple thermostatically controlled devices like an HVAC (heating, ventilation and air conditioning) system, a water heater, a space heater, a spa, etc. These devices consume about 70% of the electricity in a typical home. Electrical energy wastage frequently occurs in these systems due to excessive or unnecessary heating or cooling as compared to what may actually be required. Significant savings can be achieved by dynamic set-point adjustments of these thermostatically controlled devices based on operating conditions and user trends. It was estimated by the U.S. Environmental Protection Agency (EPA) that by employing efficient programming control of these devices, around 23% of electrical power can be saved. The existing solutions (independent programmable thermostats) require tedious manual programming, and therefore most are not actually programmed after installation. it was also observed that due to programming inaccuracies, the savings actually realized is likely to be much less than intended. Hence, an automated and centralized solution that is easy fir a contractor (installer) and/or occupant to setup and configure is needed to intelligently control the various thermostatically controlled devices in an environment, such as a home, for higher savings.

SUMMARY

These needs and others are met by embodiments of the disclosed concept, which are directed to a system employing a centralized control module for intelligently controlling a number of thermostatically controlled devices.

In one embodiment, a control module for controlling a thermostatically controlled device is provided that includes a processor apparatus including a processing unit and a memory, wherein the memory stores one or more routines executable by the processing unit. The one or more routines are adapted to obtain first values for a plurality of parameters for the thermostatically controlled device, the parameters including actual power consumed by the thermostatically controlled device and a number of input parameters, determine a learned correlation function for the thermostatically controlled device based on the obtained values, wherein the learned correlation function relates power consumption of the thermostatically controlled device to at least the number of input parameters, obtain second values for each of the number of input parameters for a future usage period, and determine at least one recommended set point for the thermostatically controlled device using the learned correlation function and at least the second values for each of the number of input parameters.

In one embodiment, a method of controlling a thermostatically controlled device is provided that includes steps of obtaining first values for a plurality of parameters for the thermostatically controlled device, the parameters including actual power consumed by the thermostatically controlled device and a number of input parameters, determining a learned correlation function fur the thermostatically controlled device based on the obtained values, wherein the learned correlation function relates power consumption of the thermostatically controlled device to at least the number of input parameters, obtaining second values for each of the number of input parameters for a future usage period, and determining at least one recommended set point for the thermostatically controlled device using the learned correlation function and at least the second values for each of the number of input parameters.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
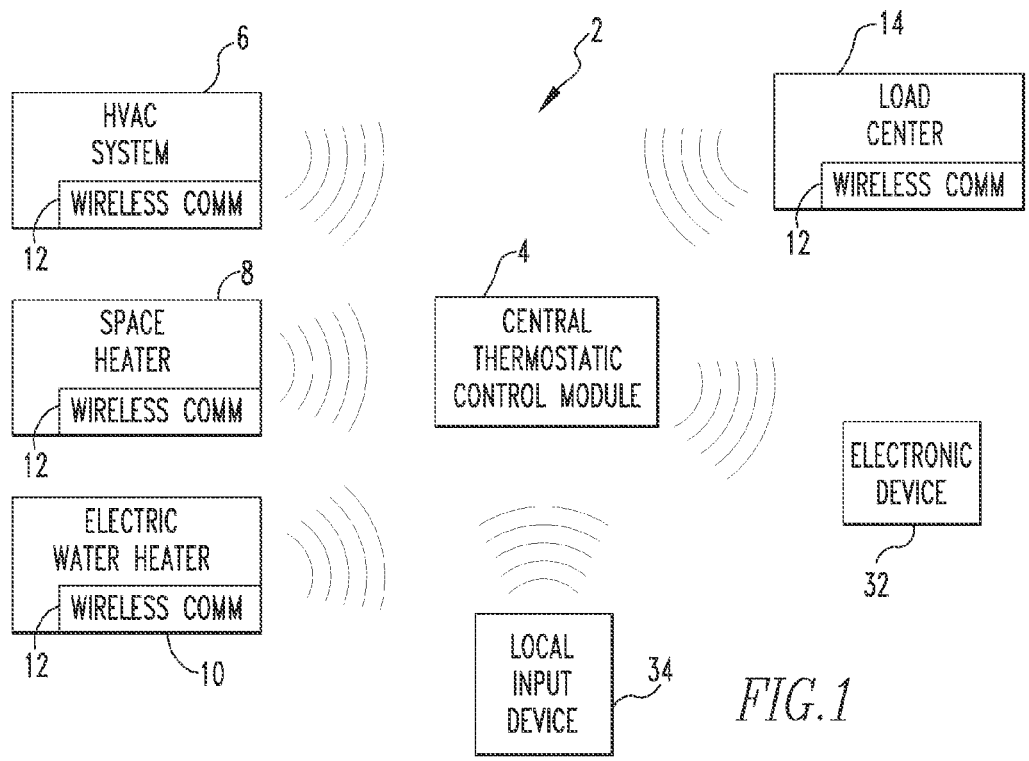
FIG. 1 is a schematic block diagram of a system provided in an environment, such as, without limitation, a residential home, which provides for the centralized intelligent control of a number of thermostatically controlled devices according to one exemplary, non-limiting illustrative embodiment of the present invention.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "thermostatically controlled device" shall mean a device whose operation is controlled based at least in part on temperature related control input (referred to as a set point).

The concept disclosed herein relates to a system provided in an environment, such as, without limitation, a residential home or other building, which provides for the centralized intelligent control of a number of thermostatically controlled devices. As described in greater detail herein in connection with a number of particular exemplary embodiments, the system employs an automated, centralized control module that is able to learn the behavior of each of a number of thermostatically controlled devices independently, and thereafter control each device intelligently for achieving increased savings. Since a single, centralized control module can learn and control the various thermostatically controlled devices, the disclosed system is highly cost effective and is able to give significant cost savings to the end user. in addition, the disclosed system is highly scalable and can be implemented across any of a number of multiple platforms (e.g., a load center (including a circuit breaker), a home automation system, a thermostat, etc.) available in an environment such as a home.

As described in detail herein, in the exemplary, preferred embodiment, the centralized control module communicates wirelessly with the various thermostatically controlled devices (e.g., an air conditioner or HVAC system, a water heater, a space heater, etc.) in an environment such as a home. During a learning phase, the system logs the user usage of these devices correlated to various parameters like day, time of day, weather information, user comfort, etc. An expert system based learning algorithm, such as, without limitation, an artificial neural network, is then used for learning the behavior of the thermostatically controlled devices in order to create for each device a learned correlation function that relates power consumption of the device to the various logged parameters. Thereafter, during a prediction and control phase, the centralized control module determines appropriate set points for each of the various thermostatically controlled devices depending on the developed correlation function corresponding to the device and certain operating conditions, and conveys the suggested set points to the user for approval. Based on the user's inputs (acceptance or rejection of the new set points), the necessary control actions are taken. in one exemplary embodiment, and as described in greater detail herein, the optimum temperature set points are determined while taking into consideration various real time conditions like weather conditions, time of use electricity pricing signals, and user behavior, among others. For example, energy cost savings may be obtained either by changing the temperature set points of a number of devices or by time pre-shifting the cooling or heating loads to times where energy costs are lower.

FIG. 1 is a schematic block diagram of a system 2 provided in an environment, such as, without limitation, a residential home, which provides for the centralized intelligent control of a number of thermostatically controlled devices according to one exemplary, non-limiting illustrative embodiment of the present invention. Referring to FIG. 1, system 2 includes a central thermostatic control module 4 which functions as the automated, centralized control module described above. System 2 also includes the following three exemplary thermostatically controlled devices that are controlled by central thermostatic control module 4: (i) an HVAC system 6, (ii) a space heater 8, and (iii) an electric water heater 10. it will be understood, however, that this is meant to be exemplary only, and that more or less and/or different thermostatically controlled devices may also be provided within the scope of the present invention.

Each of the thermostatically controlled devices is provided with a controller that controls the operation of the device based on set point inputs. In addition, as seen in FIG. 1, each of the thermostatically controlled devices is, in the illustrated embodiment, provided with a wireless communications module 12 for enabling short range wireless communications with central thermostatic control module 4. It will be appreciated, however, that this is meant to be exemplary only, and that communications with central thermostatic control module 4 may alternatively be through a wired connection or Power Line Carrier (PLC) communications. In addition, a long range wired or wireless communications interface (not shown) is also provided to obtain information exterior to the environment via the Internet.

System 2 further includes a load center 14 (comprising a circuit breaker panel) which is coupled to each of HVAC system 6, space heater 8, and electric water heater 10. Load center 14 is structured to, using known methods, be able to measure the power consumed by each of HVAC system 6, space heater 8, and electric water heater 10 (using, for example, a current sensor and/or a voltage sensor (not shown)) and communicate that information to central thermostatic control module 4. In the exemplary embodiment, such communication is enabled wirelessly by wireless communications module 12, although it will be appreciated that a wired connection may also be employed. The function of load center 14 as just described may be implemented in an alternative platform, such as, without limitation, a home automation system or a thermostat system including controllable circuit breakers so that a dedicated branch circuit load (for example: space heater, electric water heater) may be controlled directly in lieu of a separate thermostatic control device controller located at the load.

Figure 2:
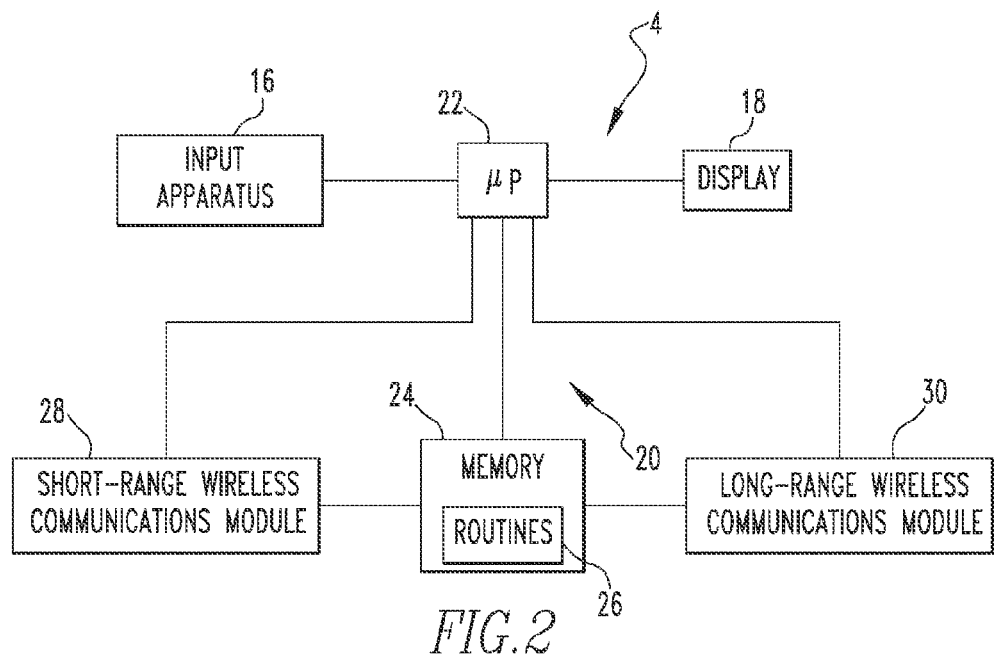
FIG. 2 is a block diagram of central thermostatic control module 4 according to one non-limiting exemplary embodiment.

FIG. 2 is a block diagram of central thermostatic control module 4 according to one non-limiting exemplary embodiment. The exemplary central thermostatic control module 4 includes an input apparatus 16 (such as a keypad or keyboard), a display 18 (such as an LCD or a touchscreen), and a processor apparatus 20. A user is able to provide input into processor apparatus 20 using input apparatus 16 (and/or display 18 if it is a touchscreen). Processor apparatus 20 provides output signals to display 18 to enable display 18 to display information to the user as described in detail herein.

Processor apparatus 20 comprises a processing unit 22 and a memory 24. Processing unit 22 may be, for example and without limitation, a microprocessor (µP) that interfaces with memory 24. Memory 24 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 24 has stored therein a number of routines 26 that are executable by processing unit 22. One or more of the routines 26 implement (by way of computer/processor executable instructions) the centralized control discussed briefly above and described in greater detail below that is configured to intelligently control HVAC system 6, space heater 8, and electric water heater 10.

As seen in FIG. 2, central thermostatic control module 4 also includes a short range wireless communications module 28 that is structured and configured to enable central thermostatic control module 4 to communicate with HVAC system 6, space heater 8, electric water heater 10, and load center 14 over a short range wireless network. Short range wireless communications module 28 may be, for example and without limitation, a WiFi module, a Bluetooth® module, a ZigBee module, IEEE802.15.4 module, or any other suitable short range wireless communications module that provides compatible communications capabilities. Central thermostatic control module 4 also includes a long range wireless communications module 30 (e.g., a modem) that is structured and configured to enable central thermostatic control module 4 to communicate over a suitable network, such as the Internet, to obtain data from any of a number of Internet sources.

Referring again to FIG. 1, system 2 further includes an electronic device 32 which may be, for example and without limitation, a smartphone, a tablet PC, a laptop, or some other portable computing device. Electronic device 32. may also be a non-portable computing device such as a desktop PC. Electronic device 32 is structured to be able to communicate wirelessly with central thermostatic control module 4. The function of electronic device 32 in system 2 is described elsewhere herein.

Furthermore, in one embodiment, system 2 includes a local (e.g., wirelessly enabled) input device (and user interface) 34 that enables a user to provide a first input (communicated to central thermostatic control module 4) to indicate that he or she is leaving the environment (e.g., home). In response to receipt of the first input, central thermostatic control module 4 will send a control signal to one or more of the thermostatically controlled devices to change the set points thereof in order to allow and immediate setback and savings. A user may provide a second input to input device 34 (e.g., directly at the input device 34 or via wireless communication from another electronic device such as a smartphone, laptop or tablet PC) which indicates a time of return to the environment (e.g., arrival in 60 minutes) and which is communicated to central thermostatic control module 4. In response to receipt of the second input, central thermostatic control module 4 will send another control signal to one or more of the thermostatically controlled devices to change the set points back to their original values or to some other user specified value. Input device 34 would, in one embodiment, ideally be located by the entry door for easy access and use. In another aspect, input device 34 or central thermostatic control module 4 may include feature a wherein it has access to the user's electronic calendar on his or her mobile device (e.g., smartphone, laptop or tablet PC), preferably with a manual override option, to enable input device 34 or central thermostatic control module 4 to recognize when the user will be in an out of the environment in order to automatically control one or more of the thermostatically controlled devices with setting for when the user is not in the environment (cost savings) and when the user returns to the environment.

Figure 3:
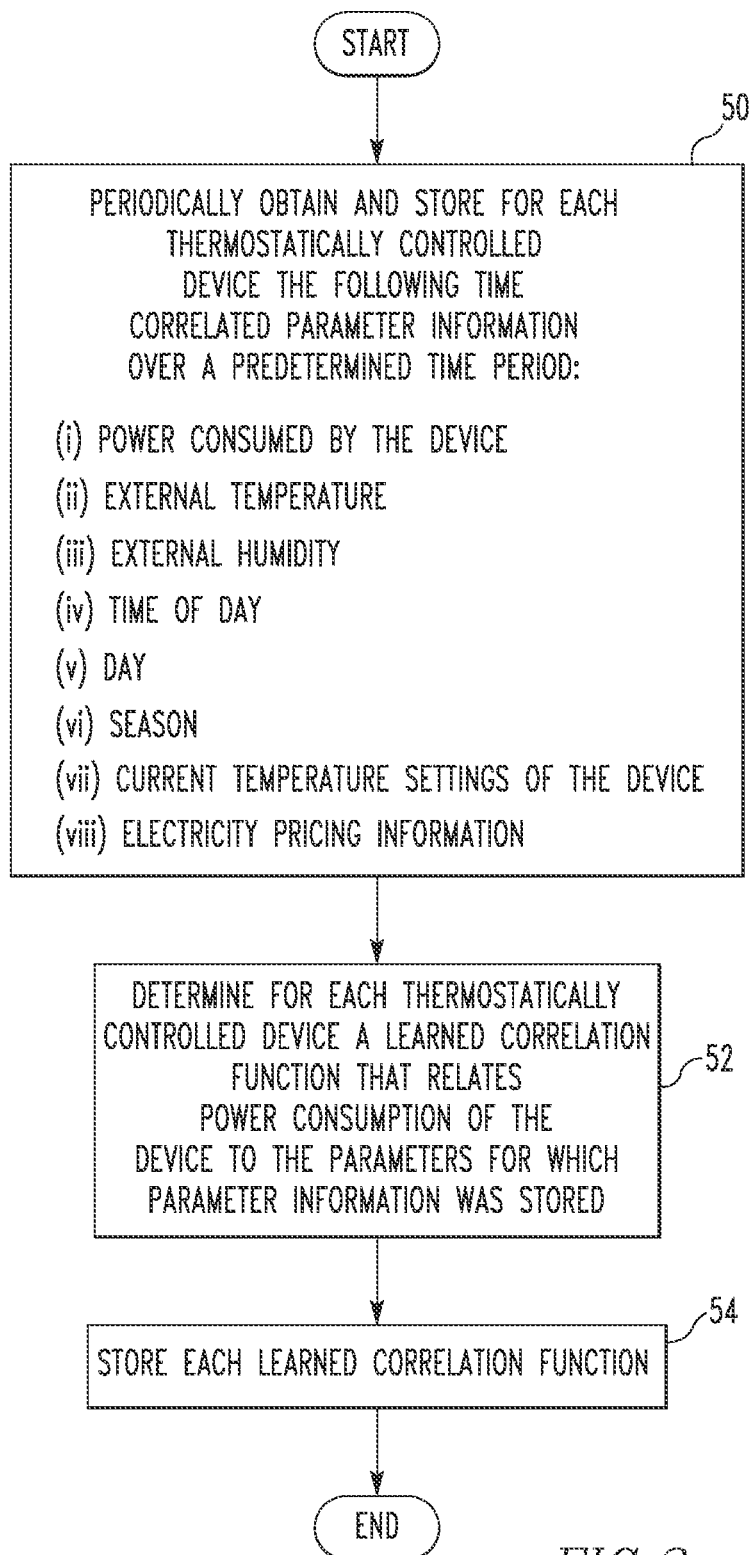
FIG. 3 is a flowchart showing the implementation of the learning phase of the centralized control methodology of the present invention according to one exemplary, non-limiting particular embodiment.

FIG. 3 is a flowchart showing the implementation of the learning phase of the centralized control methodology of the present invention according to one exemplary, non-limiting particular embodiment (which may be implemented in the routines 26 of processor apparatus 20). As noted elsewhere herein, the purpose of the learning phase is to create for each thermostatically controlled device (e.g., HVAC system 6, space heater 8, and electric water heater 10) a learned correlation function that relates power consumption of the device to the various logged parameters, The method of FIG. 3 begins at step 50, wherein central thermostatic control module 4 periodically (e.g., every few minutes) and over a predetermined period of time (e.g., two weeks) obtains and stores in memory 24 for each thermostatically controlled device (e.g., HVAC system 6, space heater 8, and electric water heater 10 in the present example) certain parameter information. In the illustrated embodiment, the logged parameter information includes the following eight pieces of data: (i) the power consumed by the thermostatically controlled device since the last measurement (i.e., during the current period; (ii) the external temperature (i.e., external to the home or other building); (iii) the external humidity (i.e., external to the home or other building); (iv) the current time of day; (v) the current day; (vi) the current season (e.g., day of the year); (vii) the current temperature settings (set points) of the thermostatically controlled device, and (viii) electricity pricing information. It will be understood, however, that these parameters are meant to be exemplary only, and that more or less and/or different data (input parameters) may also be obtained and stored in this step, In the exemplary embodiment, the power consumed by the thermostatically controlled device is provided/communicated to central thermostatic control module 4 by load center 14 wirelessly as described herein, the external temperature and external humidity and electricity pricing information are obtained automatically by central thermostatic control module 4 from an external source, such as over the Internet from a suitable website using long range wireless communications module 30 or some other suitable network connection method (e.g., Wi-Fi or a wired connection), the current time of day, current day and current season are obtained from an onboard clock of central thermostatic control module 4 and/or via an external source, such as over the Internet, and the current temperature settings (set points) of the thermostatically controlled device are provided/communicated to central thermostatic control module 4 by the thermostatically controlled device wirelessly as described herein. In one particular embodiment, central thermostatic control module 4 may further determine certain user patterns (like temperature settings/set points from the previous day, same time, or the previous week, same day, same time) based on the data obtained and stored in step 50.

Figure 4:
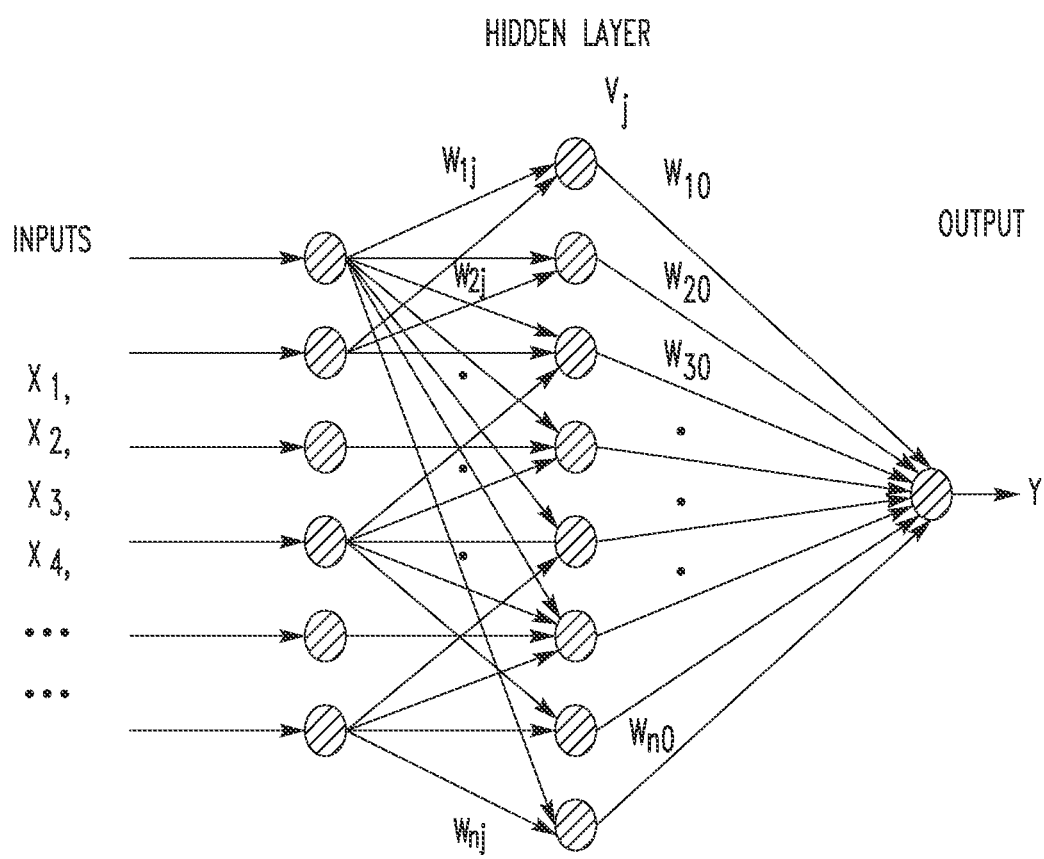
FIG. 4 is a schematic block diagram showing a learned correlation function determined using an artificial neural network.

At step 52, central thermostatic control module 4 determines for each thermostatically controlled device (e.g., HVAC system 6, space heater 8, and electric water heater 10 in the present example) a learned correlation function (Y) that relates power consumption of the thermostatically controlled device to the input parameters (other than power consumed) Obtained and stored in step 50 using an expert system based learning algorithm/technique. In the exemplary embodiment, the learned correlation function (Y) is determined using the data collected in step 50 and an artificial neural network as shown schematically in FIG. 4, wherein Power Consumed=Output=Y=$f(x_1, x_2, x_3, \ldots)$, and wherein $x_1, x_2, x_3, \ldots$ are the input parameters (other than power consumed) obtained and stored in step 50. It will be appreciated, however, that this is meant to be exemplary only, and that other expert system based learning techniques may be used to determine the learned correlation function Y, such as, without limitation, Fuzzy Logic, Support Vector Regression, Clustering, Bayesian networks, among others. Furthermore, it will be understood that step 52 is, in the exemplary embodiment, performed in/by processor apparatus 20 of central thermostatic control module 4 using a number of the routines 26. Then, at step 54, each of the determined learned correlation functions is stored in memory 24 of central thermostatic control module 4 for subsequent use in the prediction and control phase, which is described in detail below.

Figure 5:
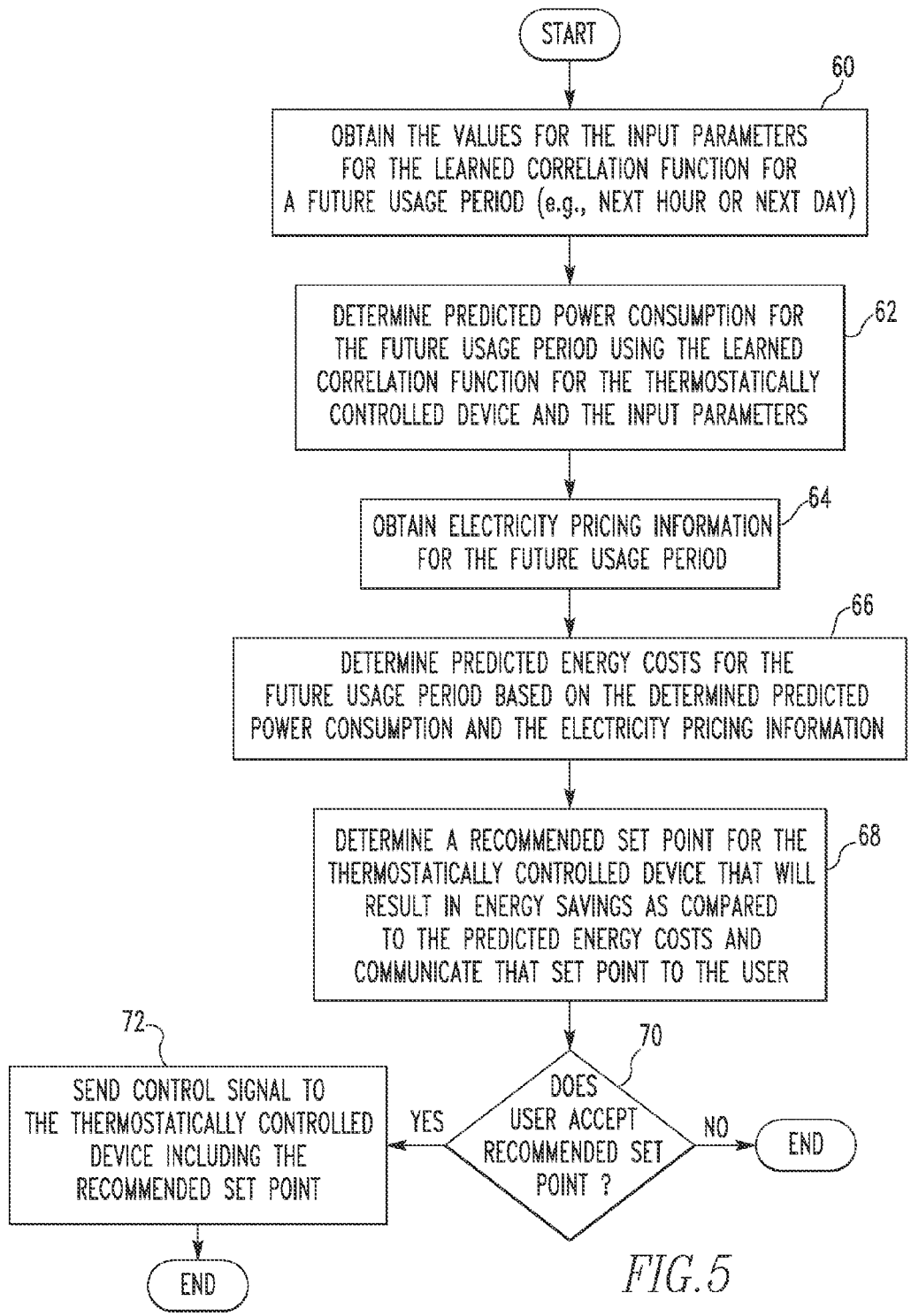
FIG. 5 is a flowchart showing the implementation of the prediction and control phase of the centralized control methodology of the present invention according to one exemplary, non-limiting particular embodiment.

FIG. 5 is a flowchart showing the implementation of the prediction and control phase of the centralized control methodology of the present invention for a particular one of the thermostatically controlled devices according to one exemplary, non-limiting particular embodiment (which may be implemented in the routines 26 of processor apparatus 20). As noted elsewhere herein, the purpose of the prediction and control phase is to determine an appropriate set point for a thermostatically controlled device depending on the developed learned correlation function corresponding to the device and certain operating conditions, and to convey the suggested set point to the user for approval. Based on the user's inputs (acceptance or rejection of the new set point(s)), the necessary control actions are taken. For illustrative purposes, the method of FIG. 5 will be described in connection with control of HVAC system 6 (i.e., it is the "particular one of the thermostatically controlled devices"). It will be understood, however, that that is meant to be exemplary only, and that the method of FIG. 5 may be used to control any thermostatically controlled device forming a part of system 2.

The method of FIG. 5 begins at step 60, wherein central thermostatic control module 4 obtains a value for each of the input parameters for the learned correlation function created for HVAC system 6 for a certain specified future period of use ("future usage period") of HVAC system 6. For example, and without limitation, the future usage period may be the next hour, the next day, or any other predetermined future period of time. In one embodiment, the user is queried as to the particular future usage period that is of inertest (e.g., the next-hour consumption, next two-hours, next 24 hours), and based on the response, the recommendation for temperature settings are made as described herein. In another embodiment, the particular future usage period may be suggested to the user based on weather forecast, predicted user pattern, ToU pricing, thermal resistance/response time of building envelope, etc. In the exemplary embodiment, the input parameter values are obtained as follows: the predicted external temperature and external humidity for the future usage period are obtained automatically by central thermostatic control module 4 from an external source, such as over the Internet, the time of day, day and season of the future usage period are obtained using the onboard clock of central thermostatic control module 4, and the temperature settings (set point(s)) of HVAC system 6 for the future usage period are provided/communicated to central thermostatic control module 4 by HVAC system 6 wirelessly as described herein. In addition, in one particular embodiment, central thermostatic control module 4 will access any previously determined/learned user patterns that are applicable to the future usage period and that may be used by the learned correlation function.

Next, at step 62, central thermostatic control module 4 determines the predicted power consumption of HVAC system 6 for the future usage period by plugging the input parameter values obtained in step 60 into the learned correlation function created for HVAC system 6. Then, at step 64, central thermostatic control module 4 obtains the electricity pricing information that is applicable to the future usage period from an external source, such as over the Internet as described elsewhere herein. In step 66, central thermostatic control module 4 then determines the predicted energy costs for HVAC system 6 for the future usage period based on the predicted power consumption of HVAC system 6 determined in step 62 and the electricity pricing information obtained in step 66.

Next, at step 68, central thermostatic control module 4 determines a recommended set point (or points) for HVAC system 6 for the future usage period that will result in energy cost savings as compared to the predicted energy costs determined in step 66. As will be appreciated, the energy savings will be achieved by a recommended set point (or points) that are different (higher or lower) than the current actual set point or points of HVAC system 6 for the future usage period. Central thermostatic control module 4 communicates the recommended set point (or points) to a user (e.g., a homeowner). In one embodiment, this communication is performed by displaying the recommended set point (or points) on display 18 of central thermostatic control module 4. Alternatively, the recommended set point (or points) may be communicated to the user by wirelessly transmitting that information to electronic device 32 on that it can be displayed to the user electronic device 32. Next, at step 70, central thermostatic control module 4 determines whether the user has indicated that he or she will accept the recommended set point (or points). This determination will be made based on either user input into central thermostatic control module 4 (using, for example, input apparatus 16) or user input into electronic device 32 that is then communicated (e.g., wirelessly) to central thermostatic control module 4. If the answer at step 70 is no, then the method ends. If, however, the answer at step 70 is yes, then, at step 72, central thermostatic control module 4 causes a control signal to be generated and transmitted (wirelessly in the exemplary embodiment) to HVAC system 6 which includes the recommended (and accepted) set point (or points) for the future usage period. As wilt be appreciated, the transmitted recommended set point (or points) will be used by HVAC system 6 to control operation HVAC system 6 during the future usage period.

In one particular alternative embodiment, a list of multiple (different) recommended set points for the future usage period is communicated to the user from which the user is able to select a desired set point for ultimate communication to HVAC system 6 as described herein.

In another particular alternative embodiment, the recommended set point (or points) for HVAC system 6 determined at step 68 may be for a time period prior to the future usage period so as to effect a desired change during the future usage period while at the same time achieving an energy cost savings. For example, the heating or cooling loads may be pre-shifted to a period just prior to the future usage period that perhaps has lower electricity costs while still achieving desired temperatures in the actual future usage period.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A control module for controlling a thermostatically controlled device, comprising:
   a processor apparatus including a processing unit and a memory, the memory storing one or more routines executable by the processing unit, the one or more routines being adapted to:
   obtain first values for a plurality of parameters for the thermostatically controlled device, the parameters including actual power consumed by the thermostatically controlled device and a number of input parameters, wherein the number of input parameters include external temperature and current temperature settings of the thermostatically controlled device, external humidity, current time of day, current day, and current season;
   determine a learned correlation function for the thermostatically controlled device based on the obtained values, wherein the learned correlation function relates power consumption of the thermostatically controlled device to at least the number of input parameters;
   obtain second values for each of the number of input parameters for a future usage period;
   determine at least one recommended set point for the thermostatically controlled device using the learned correlation function and at least the second values for each of the number of input parameters; and control the thermostatically controlled device based on the at least one recommended set point.

2. The control module according to claim 1, wherein the one or more routines are also adapted to: (i) obtain energy pricing information for the future usage period, (ii) determine a predicted power consumption of the thermostatically controlled device for the future usage period using the learned correlation function and the second values for each of the number of input parameters, (iii) determine a predicted energy cost for the thermostatically controlled device for the future usage period based on the energy pricing information and the predicted power consumption, and (iv) determine the at least one recommended set point based on the predicted energy cost.

3. The control module according to claim 2, wherein the energy pricing information is electricity pricing information for the future usage period.

4. The control module according to claim 2, wherein the at least one recommended set point is determined so as to achieve an energy savings for the future usage period as compared to the predicted energy cost.

5. The control module according to claim 1, wherein the one or more routines are also adapted to cause the at least one recommended set point to be communicated to a user, receive a signal indicating that the at least one recommended set point has been approved, and in response to receiving the signal, cause a control signal including the at least one recommended set point to be communicated to the thermostatically controlled device for controlling the thermostatically controlled device.

6. The control module according to claim 5, further comprising a display, wherein the one or more routines are also adapted to cause the at least one recommended set point to be communicated to the user by causing the at least one recommended set point to be displayed on the display.

7. The control module according to claim 5, wherein the one or more routines are also adapted to cause the at least one recommended set point to be communicated to the user by transmitting the at least one recommended set point to an electronic device.

8. The control module according to claim 1, wherein the thermostatically controlled device is selected from a group consisting of an HVAC system, a space heater and a water heater.

9. The control module according to claim 1, wherein the number of input parameters include one or more of external temperature, external humidity, current time of day, current day, current season, and current temperature settings of the thermostatically controlled device.

10. The control module according to claim 1, wherein the one or more routines are adapted to determine the learned correlation function using an expert system based learning technique.

11. The control module according to claim 10, wherein the one or more routines are adapted to determine the learned correlation function using an artificial neural network.

12. The control module according to claim 1, wherein the one or more routines are adapted to determine the at least one recommended set point using the learned correlation function, at least the second values for each of the number of input parameters, and a learned pattern of usage of the thermostatically controlled device.

13. The control module according to claim 1, wherein the one or more routines are also adapted to cause the at least one recommended set point to be communicated to a user, receive a signal indicating that the at least one recommended set point has been approved, and in response to receiving the signal, cause a control signal including the at least one recommended set point to be communicated to a circuit breaker for controlling the thermostatically controlled device.

14. The control module according to claim 1, wherein a local input device for receiving one or more inputs indicting when an environment including the thermostatically controlled device will be occupied is provided in the environment, and wherein the processor apparatus is configured to control the thermostatically controlled device based on the one or more inputs.

15. A method of controlling a thermostatically controlled device, comprising:

obtaining, by a processor, first values for a plurality of parameters for the thermostatically controlled device, the parameters including actual power consumed by the thermostatically controlled device and a number of input parameters, wherein the number of input parameters include external temperature and current temperatures settings of the thermostatically controlled device, external humidity, current time of day, current day, and a current season;

determining, by the processor, a learned correlation function for the thermostatically controlled device based on the obtained values, wherein the learned correlation function relates power consumption of the thermostatically controlled device to at least the number of input parameters;

obtaining, by the processor, second values for each of the number of input parameters for a future usage period;

determining, by the processor, at least one recommended set point for the thermostatically controlled device using the learned correlation function and at least the second values for each of the number of input parameters; and controlling the thermostatically controlled device based on the at least one recommended set point.

16. The method according to claim 15, further comprising obtaining energy pricing information for the future usage period, determining a predicted power consumption of the thermostatically controlled device for the future usage period using the learned correlation function and the second values for each of the number of input parameters, determining a predicted energy cost for the thermostatically controlled device for the future usage period based on the energy pricing information and the predicted power consumption, and determining the at least one recommended set point based on the predicted energy cost.

17. The method according to claim 16, wherein the energy pricing information is electricity pricing information for the future usage period.

18. The method according to claim 16, wherein the at least one recommended set point is determined so as to achieve an energy savings for the future usage period as compared to the predicted energy cost.

19. The method according to claim 15, further comprising causing the at least one recommended set point to be communicated to a user, receiving a signal indicating that the at least one recommended set point has been approved, and in response to receiving the signal, causing the thermostatically controlled device to be controlled based on the at least one recommended set point.

20. The method according to claim 15, wherein the number of input parameters include one or more of external temperature, external humidity, current time of day, current day, current season, and current temperature settings of the thermostatically controlled device.

21. The method according to claim 15, wherein the step of determining the learned correlation function employs an expert system based learning technique.

22. The method according to claim 21, wherein the step of determining the learned correlation function employs an artificial neural network.

23. The method according to claim 13, wherein the step of determining the at least one recommended set point uses the learned correlation function, at least the second values for each of the number of input parameters, and a learned pattern of usage of the thermostatically controlled device.

\* \* \* \* \*